United States Patent [19]
Fry et al.

[11] Patent Number: 5,386,324
[45] Date of Patent: Jan. 31, 1995

[54] APPARATUS AND METHOD FOR ANTICIPATED ERROR RECOVERY USING DEBRIS PROFILES

[75] Inventors: Scott M. Fry; Pamela R. Nylander-Hill; Sushama M. Paranjape, all of Tucson, Ariz.

[73] Assignee: International Business Machines Corporation, Armonk, N.Y.

[21] Appl. No.: 99,974

[22] Filed: Jul. 30, 1993

[51] Int. Cl.6 ............................ G11B 5/09; G11B 27/36
[52] U.S. Cl. .......................................... 360/53; 360/31
[58] Field of Search .................. 360/31, 38.1, 53, 64; 371/21.6, 41

[56] References Cited

U.S. PATENT DOCUMENTS

| | | | |
|---|---|---|---|
| 5,084,786 | 1/1992 | Konno et al. | 360/53 |
| 5,124,851 | 6/1992 | Masui et al. | 360/53 |
| 5,251,077 | 10/1993 | Saitoh | 360/53 |
| 5,262,905 | 11/1993 | Takagi et al. | 360/53 |

Primary Examiner—Donald Hajec
Assistant Examiner—T. N. Forbas, Jr.
Attorney, Agent, or Firm—Baker, Maxham, Jester & Meador

[57] ABSTRACT

A tape drive data storage apparatus incorporates a system for dynamically anticipating and resolving potential data error conditions. The system performs read and/or write data transfer operations on a tape medium, during which time it generates a track performance database representing a map of potential data error conditions occurring on the tape. As operations continue, determination is made from the track performance database whether one or more track fallout thresholds have been reached in one or more regions of the tape. If so, an error recovery bellcord action is performed to minimize the occurrence of data error conditions.

20 Claims, 7 Drawing Sheets

APPARATUS AND METHOD FOR ANTICIPATED ERROR RECOVERY USING DEBRIS PROFILES

BACKGROUND OF THE INVENTION

The present invention is directed generally to the recording and retrieval of digital information on magnetic tape, and more particularly to methods and procedures for minimizing errors occurring during data transfer operations.

Conventional tape drive data storage apparatus employ various error correction and recovery methods to detect and correct data errors which, if left unresolved, would compromise the integrity of information read from or written to the magnetic tape media. Events which can lead to data errors include defects on the media, debris between the tape head and the media, and other conditions that interfere with head/media data transfer operations.

Error correction and recovery may be thought of as two distinct operations that are employed at different stages of error processing. Error correction is conventionally implemented using error correction coding (ECC) techniques in which random host data to be placed on a tape medium is encoded in a well-defined structure by introducing data-dependent redundancy information. The presence of data errors is detected when the encoded structure is disturbed. The errors are corrected by making minimal alterations to reestablish the structure. ECC error correction is usually implemented "on-the-fly" as data is processed by the tape drive apparatus. The well-known Reed-Solomon code is one cyclic encoding scheme which has been proposed for ECC error correction. Other encoding schemes are also known in the art.

Error recovery occurs when ECC error correction is unable to correct data errors or when thresholds for allowable correction are exceeded. The error recovery process usually requires stopping the tape and reprocessing a data block in which an error was detected. Typical error recovery procedures include tape refresh operations wherein a tape is wound to its end and brought back to the error recovery point, tape back-hitch or "shoeshine" operations wherein a tape is drawn back and forth across the tape head, backward tape read operations, tape tension adjustment operations and tape servo adjustment operations, to name a few.

In prior art error recovery systems, it is common to perform a preprogrammed sequence of error recovery procedures in response to data errors that result in error recovery. In many cases, however, one or more error recovery procedures may not be required. For example, track fallout errors caused by localized tape defects or track fading due to debris adhering to either the tape media or the read/write heads can affect tracks for long stretches of tape as debris is dragged along. Errors of this type can often be resolved by reversing tape motion and dislodging the debris. In that case, other error recovery procedures may be unnecessary.

Often, it is possible to correct for track fallout using ECC error correction. ECC track fallout correction usually works well during data read operations. During data write operations, however, there is an increased risk that a subsequent read of the data will result in data transfer problems. With one or more of the tracks already lost as a result of write track fallout, a further loss of track data due to debris, edge damage and other media defects during read operations may cause error recovery to be invoked.

Accordingly, there is a need in the art for a system and method for recording and retrieving digital information on a tape wherein potential error recovery conditions are anticipated and resolved using minimal error recovery techniques. Rather than wait until persistent track fallout leads to the invocation of full error recovery, it would be preferable to address the problem in advance in a manner that does not require a complete complement of preprogrammed prior recovery procedures.

SUMMARY OF THE INVENTION

In accordance with the foregoing objectives, a tape drive data storage apparatus incorporating the inventive concepts herein includes a control system for reading and writing data on a streaming tape medium, an error correction coding (ECC) system for detecting and correcting data transfer errors, and an error recovery system for performing non-ECC correctable error recovery. The tape drive further includes a system for dynamically anticipating and resolving potential error recovery conditions. The system performs read and/or write data transfer operations on a tape medium loaded in the tape drive, during which time it generates a track performance database representing a map of ECC-correctable error conditions occurring on the tape. As operations continue, determination is made from the track performance database whether one or more track fallout thresholds have been reached in one or more regions of the tape. If so, an error recovery "bellcord" action is performed to minimize subsequent nominal error recovery activity.

BRIEF DESCRIPTION OF THE DRAWINGS

The objects, advantages and features of the present invention will be more clearly understood by reference to the following detailed disclosure and the accompanying drawing in which:

FIG. 6b is a second portion of the flow diagram of FIG. 6a.

DETAILED DESCRIPTION OF THE PREFERRED EMBODIMENTS

Figure 1:
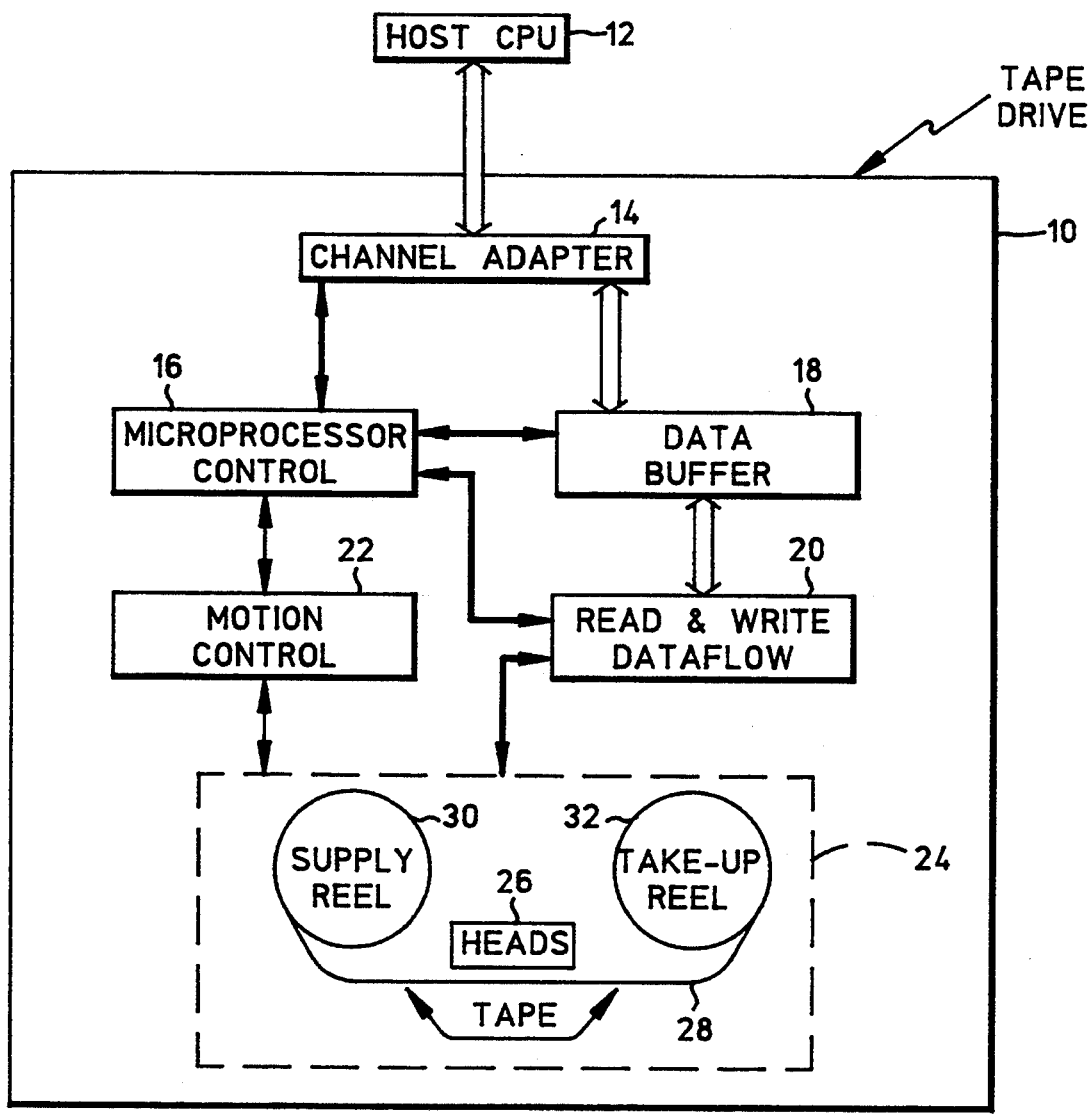
FIG. 1 is a block diagram showing a tape drive data storage device adapted for use with the present invention.

Referring now to FIG. 1, the inventive concepts herein described may be embodied in a tape drive data storage device 10 for storing (and retrieving) data provided by a host digital processing device 12, which could be a general purpose computer or other processing apparatus outputting data to be stored on a streaming magnetic tape medium. The tape drive 10 includes plural components providing a control system for reading and writing host data on the medium. Those components include a channel adaptor 14, a microprocessor controller 16, a data buffer 18, a read/write dataflow circuit 20, a motion control system 22 and a tape interface system 24.

The microprocessor controller 16 provides overhead control functionality for the operations of all other components of the tape drive 10. The functions performed by the microprocessor controller 16 are programmable via microcode routines, as is known in the art. During data write operations (with all dataflow being reversed for data read operations ), the microprocessor controller activates the channel adaptor 14 to perform the required host interface protocol for receiving an information data block. The channel adaptor 14 communicates the data block to a data buffer 18 that stores the data for subsequent read/write processing. The data buffer 18 in turn communicates the device data from the channel adaptor 14 to the read/write dataflow circuitry 20, which formats the device data into physically formatted data that may be recorded on a magnetic tape medium. The read/write dataflow circuitry 20 is also responsible for executing all read/write data transfer operations under the control of the microprocessor controller 16. Formatted physical data from the read/write circuitry 20 is communicated to a tape interface system 24 including one or more read/write heads 26 and appropriate drive components (not shown) for performing forward and reverse movement of a tape medium 28 mounted on a supply reel 30 and a take-up reel 32. The drive components are controlled by the motion control system 22 to execute such tape movements as forward and reverse recording and playback, rewind and other tape motion functions. In addition, in multi-track tape drive systems, the motion control system 22 transversely positions the read/write heads relative to the direction of longitudinal tape movement in order to record data in a plurality of tracks.

Figure 2:
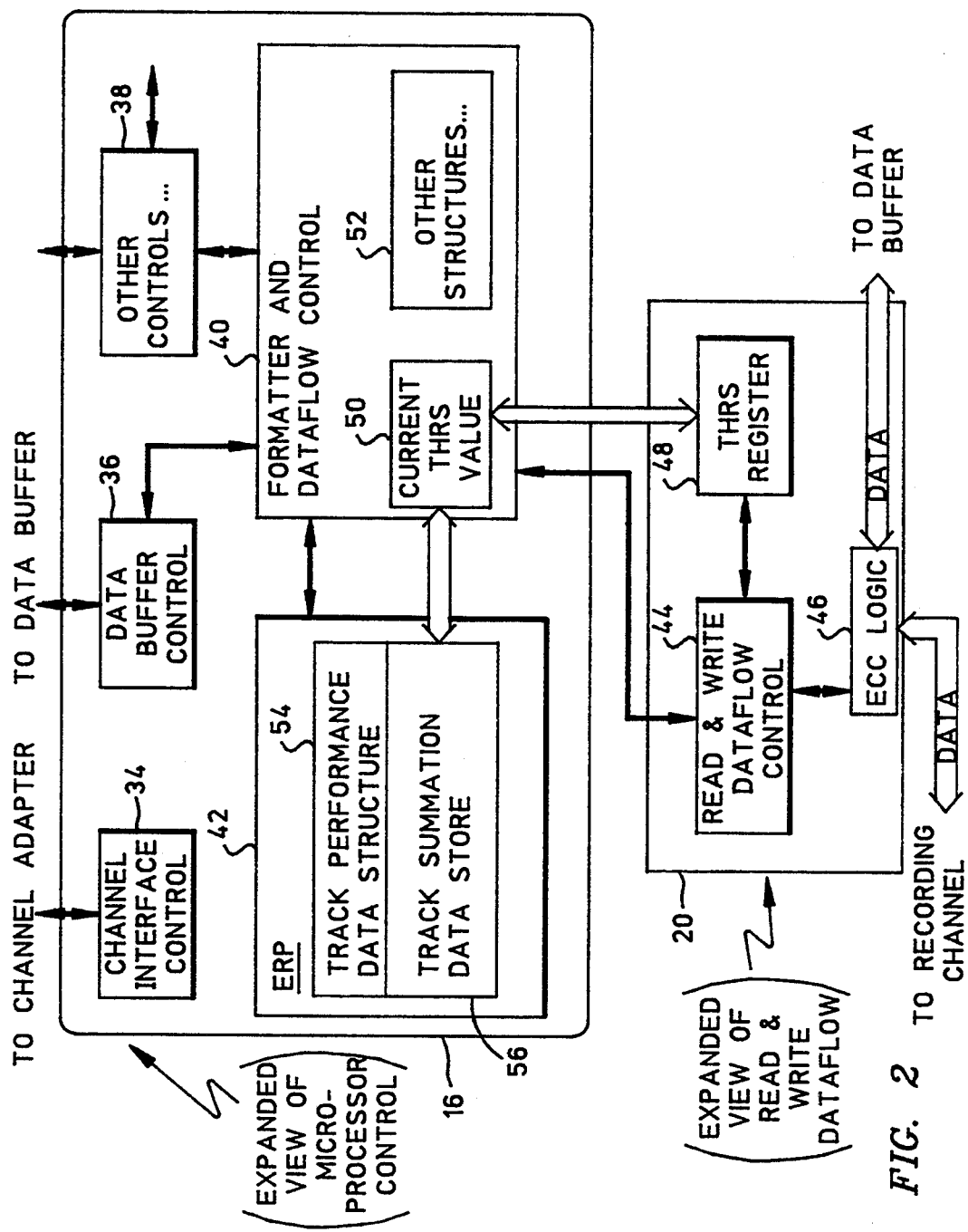
FIG. 2 is a block diagram providing an expanded view of components of the tape drive device of FIG. 1.

Referring now to FIG. 2, components of the microprocessor controller 16 and read/write dataflow circuitry 20 are shown in greater detail. The microprocessor controller 16 includes a channel interface controller 34 to implement the exchange of control information between the microprocessor controller 16 and the channel adaptor 14. The microprocessor controller 16 further includes a data buffer controller 36 to implement the exchange of control information between the microprocessor controller 16 and the data buffer 18. Other controllers, illustrated collectively by reference number 38, are used to implement the exchange of control information between the microprocessor controller 16 and other components of the tape drive control system including the motion controller 22 and other components (not shown), as is known in the art.

Additional components contained within the microprocessor controller 16 include a formatter and dataflow control system 40 and an error recovery system 42, each of which is controlled by appropriate microcode routines of the microprocessor controller 16. The formatter and dataflow control system 40 directs operations of the read/write dataflow circuitry 20, as well as the data buffer 18 via the data buffer controller 36. The error recovery system 42 is programmed to perform error recovery procedures when non-ECC correctable errors occur.

The read/write dataflow circuitry 20 includes read/write dataflow control hardware 44 that oversees read/write dataflow operations. The control hardware 44 communicates control information to ECC logic hardware 46, which performs ECC encoding/decoding of all data transferred between the data buffer 18 and the tape interface system 24.

The tape drive 10 records data on one or more data tracks of the tape medium 28 in a sequence of formatted information blocks. During ECC error correction operations, the ECC logic hardware 46 provides an ECC error correction record for each processed information block to the read/write dataflow control hardware 44. The read/write dataflow control hardware 44 stores this information in a bit register illustrated as THRS register 48 in FIG. 2. The THRS register 48 is a multi-bit register providing a single bit storage location for each active read/write channel (physical track). The bits in the THRS register 48 are set to "1" or "0" depending on whether excessive ECC error correction occurred in the corresponding physical tracks as each information block is processed. The THRS register 48 thus contains current track performance information for all active read/write channels transferring data to or from the tape medium 28. The ECC error correction threshold at which the bits of the THRS register 48 are set is programmable in the microprocessor controller 16.

As each information block on the tape medium 28 is processed, the information contained in the THRS register 48 is transferred to the formatter and dataflow control system 40 where it is placed in a THRS value store 50. As is conventional, the formatter and dataflow controller 40 includes structures and components 52, whose functions are not germane to the present disclosure, and therefore will not be described.

Where high density multi-track recording is utilized, multiple "data" tracks can be recorded using a smaller subset of "physical" tracks, with each data track being written by one and only one physical track (i.e., read/write head channel), but with physical tracks writing many data tracks. This data storage protocol is achieved using multiple tape wraps and tape wrap halfs. A tape wrap consists of a pair of outbound and inbound recording/playback passes (wrap halfs) across the entire allocated length of the tape medium. The outbound recording pass represents a first wrap half while the inbound recording pass represents a second wrap half. Each wrap consists of two wrap halfs. To maximize recording densities, the read/write heads 26 include a first set of heads that are active during the first outbound wrap half and a second set of heads that are active during the second inbound wrap half. There can be multiple wraps recorded on a tape medium. The total number of data tracks recorded on a medium is determined by multiplying the number of physical tracks or channels of the read/write heads times the number of wrap halfs recorded on the tape. For example, a tape drive that records 16 tracks per wrap half over 4 wraps generates 128 data tracks on the tape medium.

Each wrap half is intended to extend across the entire usable portion of the tape medium. In order to catalog the occurrences of ECC error correction on the tape, the present invention contemplates further dividing the tape into a plurality of tachometer regions. Tachometer regions are defined by the maximum tachometer value corresponding to the usable length of the tape divided by a number required to define an appropriate number of tachometer regions, e.g., 100 regions or some other dimension based on media type and other considerations. Using tachometer regions and data tracks, a tape map can be generated as a two dimensional structure with data tracks indicated on the y-axis and tachometer regions indicated on the x-axis. Each x, y location can be filled with an ECC track performance value determined from the THRS register 48. If the THRS register 48 indicates excessive ECC error correction activity for any track in any information block located in a tachometer region, that excessive correction value can be entered in the tape map. This information provides a track performance database that can be used for performing "bellcord" error recovery activity by the error recovery system 42, including tape refresh actions and tape backhitch or "shoeshine" actions to remove debris at the head/media interface.

Figure 3:
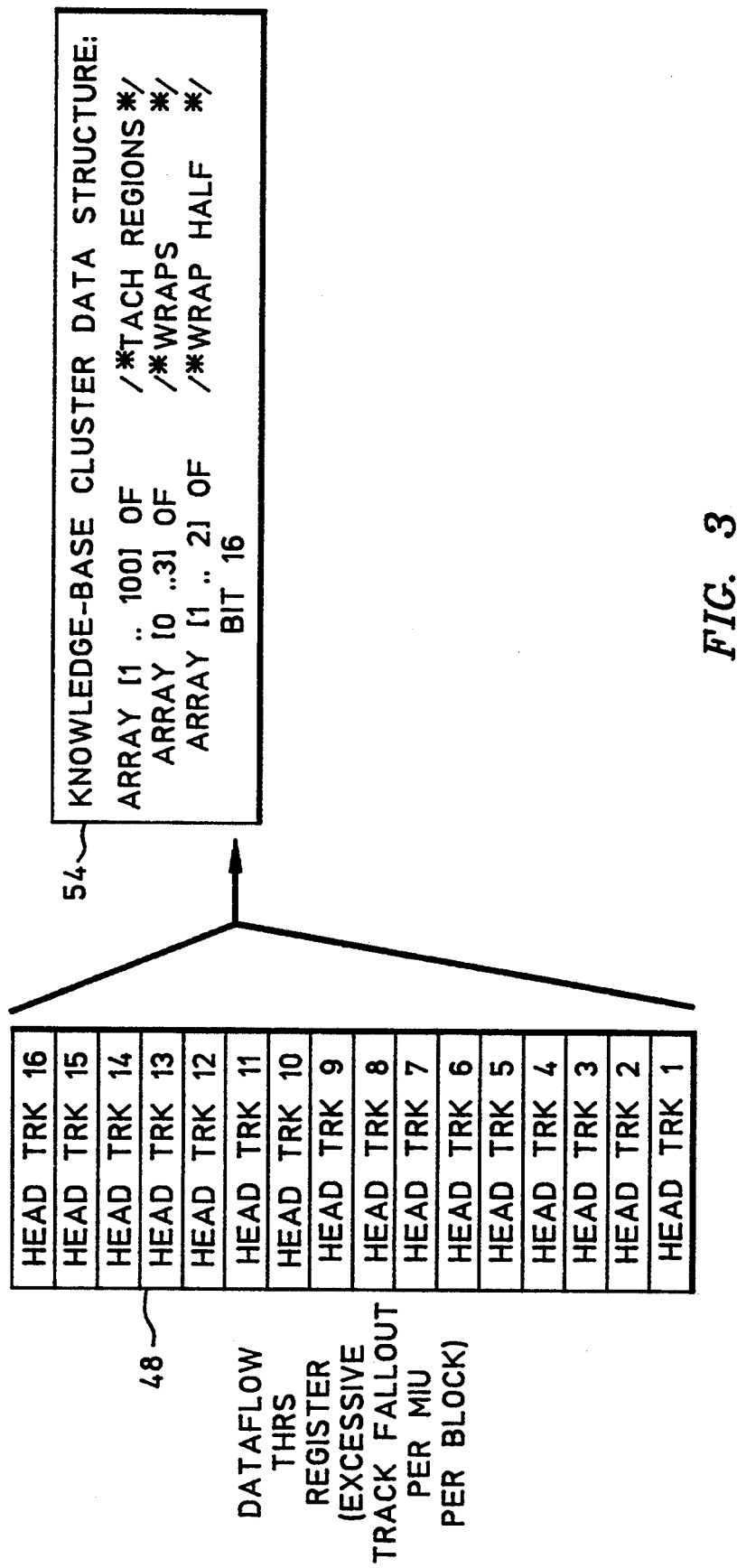
FIG. 3 is a block diagram showing components of a track performance data structure constructed in accordance with the present invention.

The track performance database is preferably embodied in the error recovery system 42 as a data structure 54. The data structure 54 defines a hierarchy of storage array locations for identifying tape map locations by tachometer region, tape wrap, tape wrap half, and tape track. This data structure array hierarchy is illustrated (in a sixteen track configuration) in FIG. 3. Although the number of tachometer regions, wraps, wrap halfs and physical tracks is arbitrary, FIG. 3 shows a tape map configuration wherein a tape is divided into 100 tachometer regions. Each tachometer region contains four wraps. Each wrap contains two wrap halfs. Each wrap half contains a sixteen bit track storage array corresponding to the THRS register bits for each physical track. The storage array locations of the data structure 54 can thus be used to uniquely catalog excessive ECC error correction (i.e., track performance) information from the THRS register 48 for each wrap half of each wrap of each tachometer region of the tape.

The data structure 54 is generated during read/write data transfer operations performed on the tape medium 28. As each multi-track information block is processed on the tape, ECC error correction information, along with region, wrap, wrap-half and direction information, is provided to the THRS register 48. That information is placed in the data store 50 in the formatter and dataflow control system 40 and sent to the error recovery system 42, together with information identifying the current tachometer region, tape wrap and tape wrap half. Initially, the sixteen bit track storage array locations of the data structure 54 are initialized to "0". Those values are set to "1" if and when a "1" bit from a corresponding location of the THRS register 48 is received. Once a "1" bit value is set in the data structure 54, it is not reset to "0" until subsequent initialization. Thus, as information blocks for the same tachometer region, tape wrap and tape wrap half are processed, the bits of the sixteen bit track storage array are set if corresponding bits are set in the THRS register 48 at any time during block processing, but are never reset to "0" even though the THRS register may contain a "0" for that track in a subsequent information block. The result of this storage array-building sequence is that if excessive ECC error correction occurred in any track in any information block of tachometer region, the corresponding storage location in the track storage array of the data structure 54 will have its bit set to indicate the excessive ECC correction.

As tape processing proceeds through successive tachometer regions, wraps and wrap halfs, the data structure 54 begins to reveal a tape map pattern of excessive ECC error correction activity. This information can be used for performing bellcord error recovery actions, which are aimed at preventing subsequent and more burdensome error recovery resulting from media defects and debris occurring between the read/write heads and the tape media. Bellcord alerts use a horizontal view of the tape map, since debris profiles are detected with fixed wrap and wrap half values, although the tape map is structured to give a vertical view as well. In order to detect a debris profile, n-consecutive tachometer regions must show persistent physical track failure. The summation set forth below is performed for each physical track actively transferring data to or from the tape medium. The designation "tr" represents the current tachometer region. The wrap, wrap half and physical tracks are held constant for each summation:

$$\sum_{region=tr-n}^{tr} Phystrack_{wrapwraphalfphytrk} = BC_{phytrk}$$

For a tape drive having sixteen active physical tracks (an arbitrary value), the above summation may be performed 16 times, allowing Phytrk to range from 1 ... 16. If any of the summations ($BC_1$ through $BC_{16}$)=n, then a bellcord action is taken. The summations can be made during block processing whenever track fallout (i.e., and active track array bit) is detected for a track. To minimize processing time, each summation, whether exceeding the bellcord threshold or not, can be stored in a track summation data store 56 that identifies debris profiles by track and region(s) covered by the debris. A bellcord action is taken if any debris profile grows beyond the bellcord threshold. The last region of the profile is then marked as a bellcord region. This effectively creates a gap in The sequence so that if track performance errors occur in the subsequent region, they do not automatically cause the bellcord threshold to be exceeded. The fact that a bellcord action was taken can be logged into a head element performance table which may be created as part of the tape map structure 54 or as a separate data structure within the error recovery system 42. The head element performance table can be utilized to distinguish between bad media and bad hardware (e.g. read/write channels).

Figure 4:
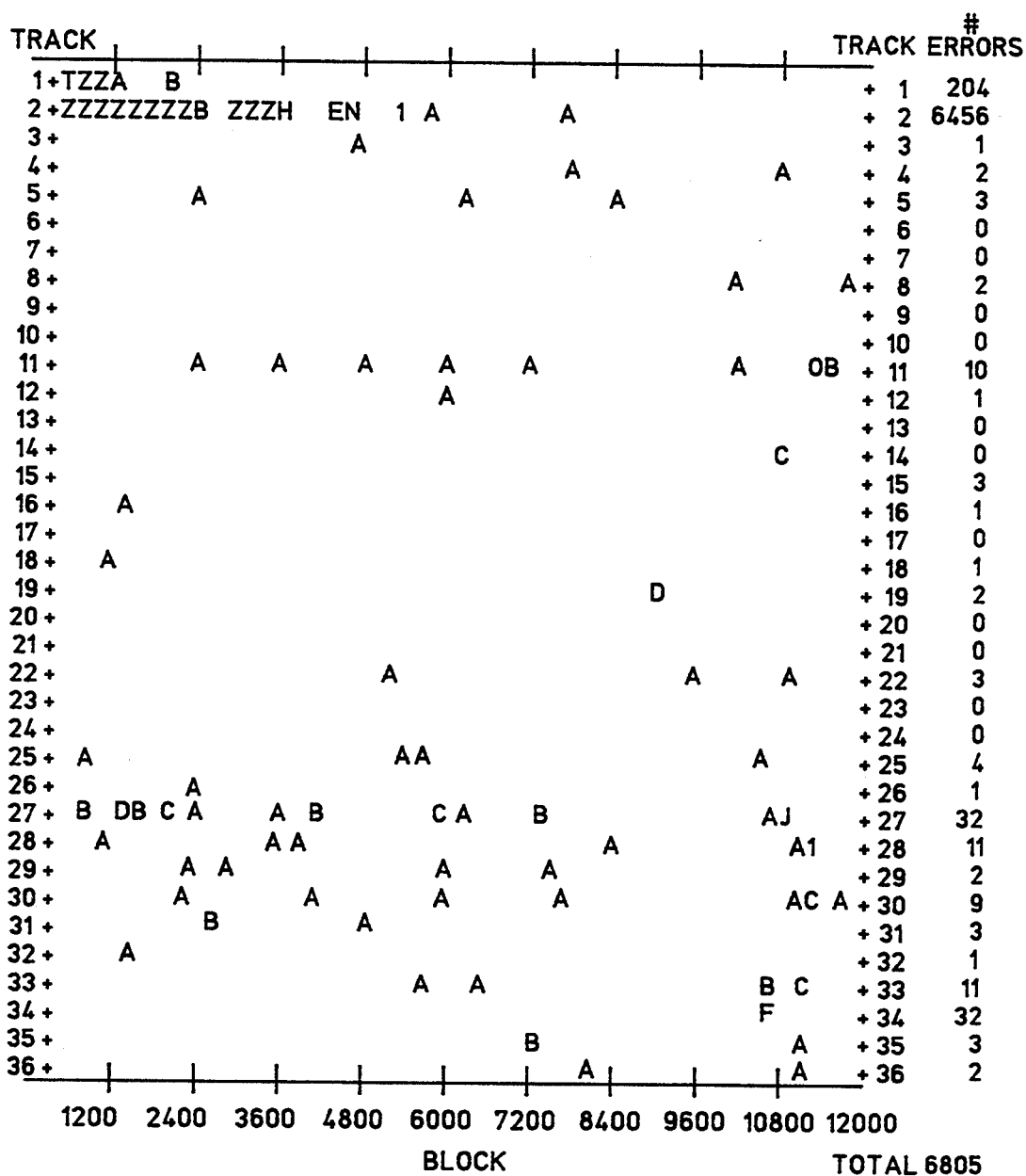
FIG. 4 is a tape map graph showing track performance information.

FIG. 4 illustrates a graphical tape map representation whose y axis is divided into tracks 1–36 and whose x axis is divided into 100 tachometer regions containing 120 information blocks each. A debris profile which could give rise to a bellcord action is shown on track 2. As the above equation indicates, horizontal debris profiles are easily determined by summing the successive error correction bits of the tape map structure 54 track storage array locations for successive tachometer regions, while holding the tape wrap, tape wrap half and tape track values constant.

The data structure 54 thus provides track performance database representing a tape map of ECC error correction locations on the tape medium. From this data structure, horizontal debris profiles can be identified using programmable track performance thresholds.

Figure 5:
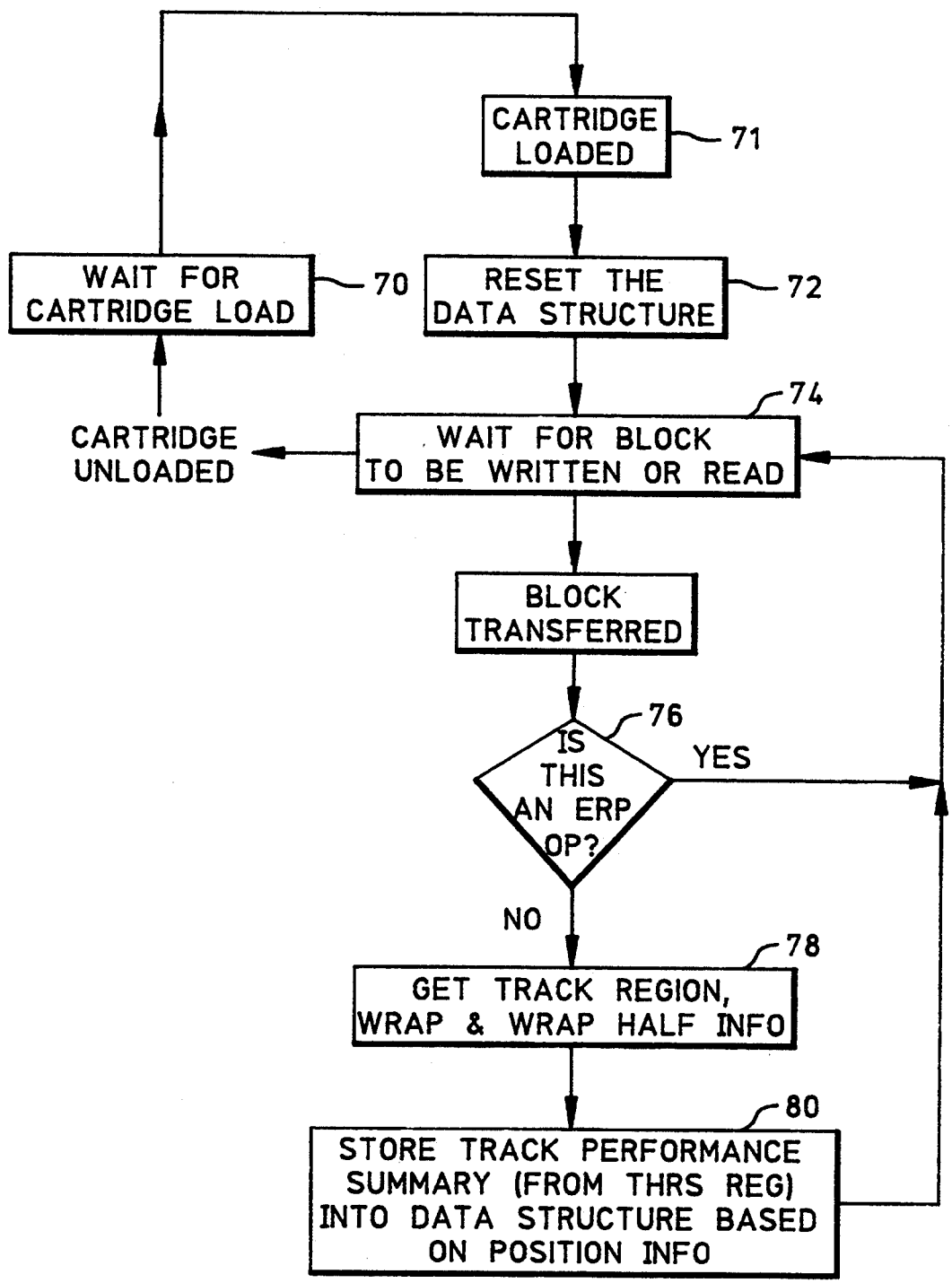
FIG. 5 is a flow diagram showing the construction of the track performance data structure of FIG. 3.

Referring now to FIG. 5, the above-described process for building the data structure 54 is shown diagrammatically as commencing with the loading of a tape cartridge containing the tape medium 28 in step 70. Upon cartridge load in step 71, the data structure 54 is reset in step 72 and the system waits for the information blocks to be written to or read from the tape medium in step 74. When an information block is transferred to or from the tape medium 28, decision is made in step 76 whether an error recovery operation (performed by the error recovery system 42) is underway. If it is, no activity is performed with respect to the data structure 54. Rather, track performance archival in the data structure 54 is suppressed during any error recovery action to avoid introducing duplicate or redundant data. Conversely, error recovery as a functional area will not be active when ECC error correction information comes in for archival in the data structure 54. If it is determined that an error recovery operation is not underway, values representing the current tachometer region, tape wrap and tape wrap half are retrieved from the read/write dataflow control hardware 44 in step 78 and used by the formatter and dataflow controller 40 to store the track performance summary information from the THRS register 48 into an appropriate array location of the data structure 54 in step 80. Process control then returns to step 74 to wait for the next information block to be written or read.

The data structure 54 may be utilized in a variety of ways to maximize tape drive efficiencies and minimize data transfer errors. In accordance with the present invention, it is proposed to use the data structure 54 as a track performance database for use in invoking one or more bellcord error recovery actions designed to eliminate errors resulting from media defects and debris occurring between the read/write heads and the tape media. Bellcord recovery is based on the recognition that debris first manifests itself as a minor disturbance which may eventually grow sufficiently to cause a data check or permanent error. Microcode within the formatter and dataflow control system 40 continuously monitors the THRS track fallout register 48 and sends it to the error recovery system 42 for analysis. Even though error recovery is not actively involved in processing the information blocks, since they are all correctable at this point, it will monitor debris patterns. A typical signature is for one or two tracks to fallout persistently for a long stretch of tape. Often this fading is caused by particular debris being carried along by the head. A backhitch or refresh can resolve the problem by moving the debris elsewhere.

When error recovery takes a bellcord action, it effectively raises an indication to the formatter and dataflow controller system 40 to stop processing data at the next information block. Once this has occurred, control is passed to the error recovery system 42. Depending on the nature of the head track profiles and other characteristics of the tape map, error recovery will request an extended backhitch or a tape refresh to be performed. Once this is complete, the error recovery system 42 releases control back to the formatter and dataflow control system 40 to continue processing data where it left off. Significantly, a bellcord action is taken in anticipation of a non-ECC recoverable data error and not because of such a data error.

Figure 6A:
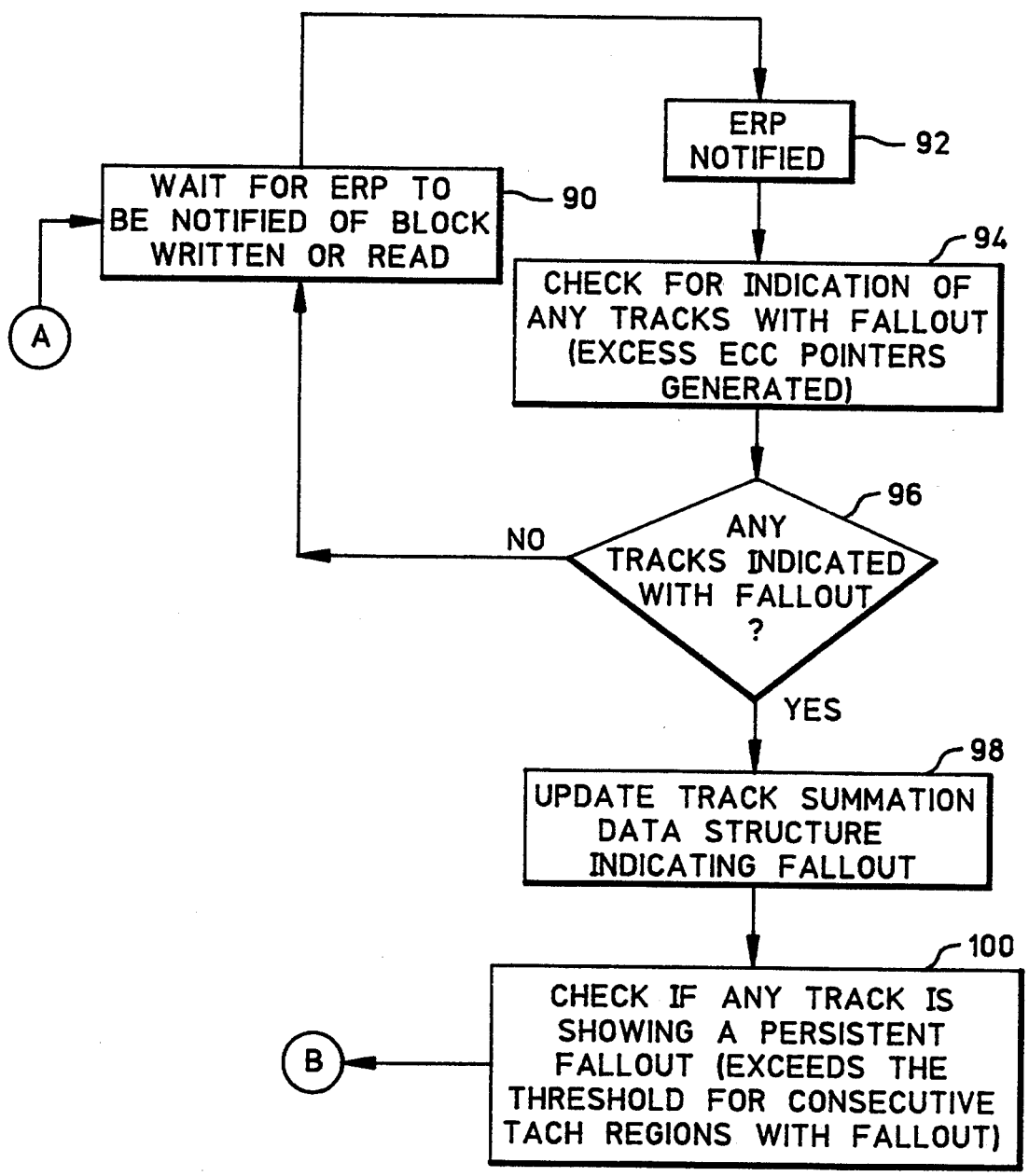
FIG. 6a is a first portion of a flow diagram showing a preferred use of the track performance data structure of FIG. 3 in accordance with the invention.
Figure 6B:
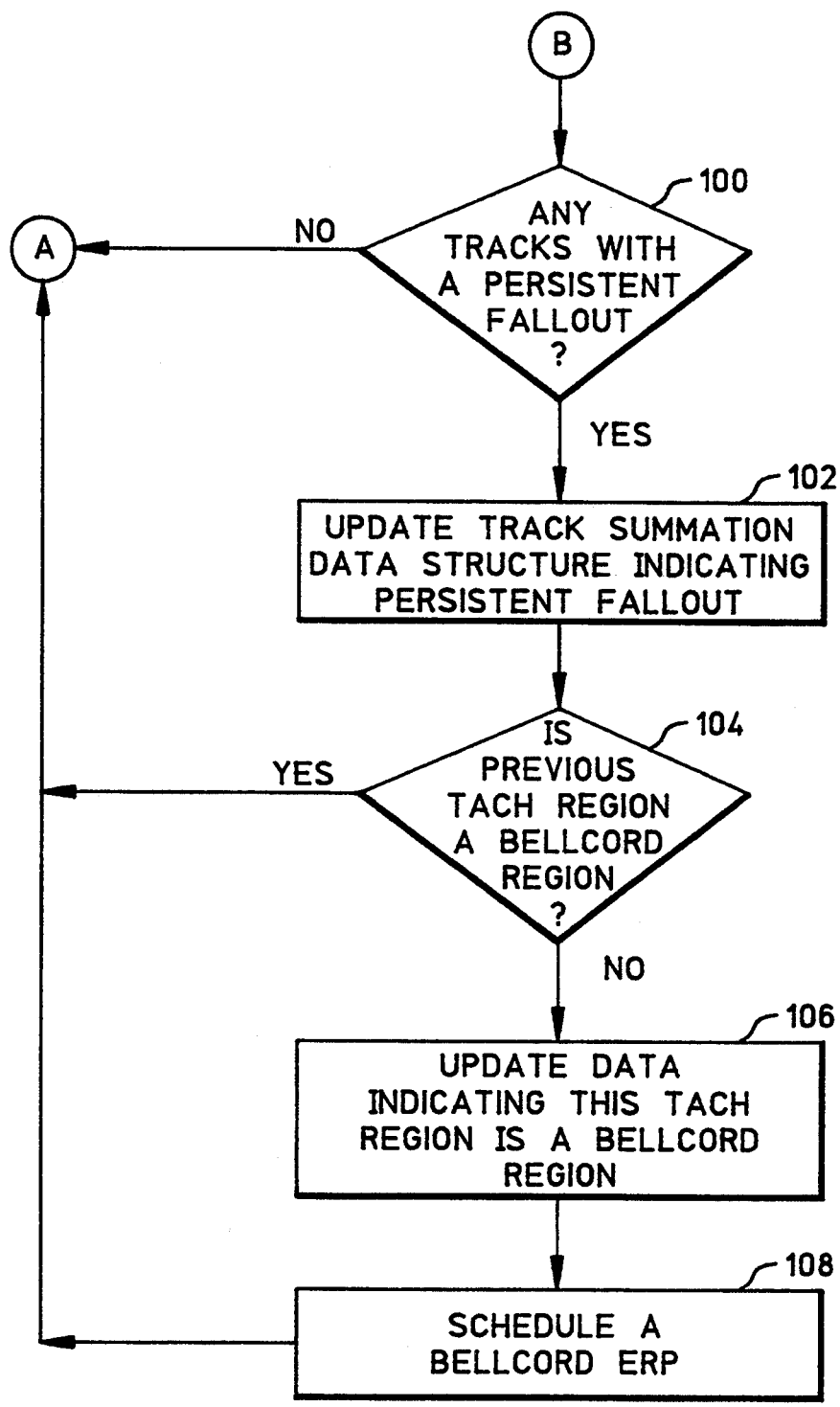

A track performance utilization process for performing bellcord error recovery actions in response to selected debris profiles is illustrated in FIGS. 6a and 6b. Beginning at process point "A", the error recovery system 42 waits at step 90 for a notification that an information block has been written to or read from the tape medium 28. Upon error recovery system notification in step 92, a check is made in step 94 for an indication of any tracks with track fallout (excessive ECC error correction activity) within the current tachometer region. If, in step 96, fallout has occurred, the track summation data store 56 is updated, if necessary, to indicate the tracks and tachometer regions exhibiting the fallout in step 98. The track performance utilization process then proceeds to point "B" in FIG. 6b. In step 100 (also shown in FIG. 6a), determination is made whether any tracks in the track summation data store 56 exhibit persistent fallout by exceeding the threshold for consecutive track regions with fallout. If the persistent track fallout threshold is not satisfied, the process returns to point "A" in FIG. 6a. If persistent track fallout is found, the track summation data store 56 is updated in step 102 by identifying the last region of the debris profile exceeding the bellcord threshold as a potential bellcord region.

In step 104, decision is made whether a previous tachometer region is also a bellcord region. If so, the track performance utilization process returns to process point "A" because a bellcord action was already taken in the previous region. If the previous tachometer region is not a bellcord region, then the track summation store 56 is updated in step 106 to indicate that the current tachometer region is a bellcord region and a bellcord error recovery procedure is executed in step 108. The process then returns to point "A" in FIG. 6a.

Accordingly, a novel method for anticipated error recovery using debris profiles has been described. While various embodiments have been disclosed, it should be apparent that many variations and alternative embodiments would be apparent to those skilled in the art in view of the teachings herein. It is understood, therefore, that the invention is not to be in any way limited except in accordance with the spirit of the appended claims and their equivalents.

We claim:

1. In a tape drive data storage apparatus including a control system for reading and writing data on a streaming tape medium, an error correction coding (ECC) system for detecting and correcting data transfer errors, and an error recovery system for performing non-ECC correctable error recovery, a method for dynamically anticipating and resolving potential data error conditions comprising the steps of:

performing read and/or write data transfer operations on one or more data tracks of a tape medium loaded in the tape drive;

generating during said data transfer operations a track performance database representing a map of ECC error correction locations occurring on the tape;

determining from said track performance database whether one or more track fallout thresholds have been reached in one or more regions of the tape; and if so performing an error recovery bellcord action to minimize subsequent data error recovery.

2. The method of claim 1 wherein said track fallout thresholds include a threshold for determining persistent track fallout for one or more data tracks of said tape.

3. The method of claim 1 wherein said track performance database stores track fallout information for multiple data tracks in multiple tachometer regions of the tape medium.

4. The method of claim 3 wherein said track fallout thresholds include a threshold corresponding to said track performance database reporting a track fallout condition for a predetermined number of previous adjacent tachometer regions for one or more of said data tracks.

5. The method of claim 1 wherein said one or more bellcord actions include a tape backhitch action.

6. The method of claim 1 wherein said one or more bellcord actions include a tape refresh action.

7. The method of claim 4 further including the step of marking a tachometer region of the tape where one or more of said track fallout thresholds have been reached as a bellcord region.

8. The method of claim 7 wherein said track fallout thresholds include a threshold corresponding to said track performance database reporting a track fallout condition for a predetermined number of previous adjacent tachometer regions for one or more of said data tracks, but not including a previous bellcord region.

9. The method of claim 1 wherein one of said track fallout thresholds include a threshold corresponding to whether said potential data error conditions are due to bad media or bad read/write hardware.

10. The method of claim 9 further including the step of recording the execution of a bellcord action in a head element performance table based on whether the bellcord action resulted from bad media or bad read/write hardware.

11. A system for dynamically anticipating and resolving potential data error conditions in a tape drive data storage device having one or more read/write heads for transferring data on one or more data tracks on a tape medium, comprising the steps of:
means for generating a track performance database comprising plural storage array locations corresponding to said data track locations on said tape medium;
means for sequentially storing in said track performance database, a continuous series of values representing potential data error conditions determined from data transfer operations performed by the tape drive data storage device; and
means responsive to said values stored in said track performance database exceeding one or more track fallout threshold values, for interrupting said sequential storing of values in said track performance database and performing one or more selected bellcord error recovery actions.

12. The system of claim 11 wherein said data storage device stores data on said tape medium in a hierarchy of tachometer regions, wraps, wrap halves and multiple tracks, and wherein said track performance database stores track fallout information for the multiple tracks of each wrap half of each wrap of each tachometer region.

13. The system of claim 12 wherein said track fallout thresholds include a threshold corresponding to a summation of values in said track performance database corresponding to potential data error conditions for each data track of a predetermined number of adjacent tachometer regions.

14. The system of claim 11 wherein said one or more bellcord actions include a tape backhitch action.

15. The system of claim 11 wherein said one or more bellcord actions include a tape refresh action.

16. The system of claim 11 further including the step of marking a region of the tape where one or more of said track fallout thresholds have been reached as a bellcord region.

17. The system of claim 16 wherein said track fallout thresholds include a threshold corresponding to said track performance database reporting a potential data error condition for a predetermined number of adjacent tachometer regions for one or more of said data tracks, but not including a previous bellcord region.

18. The system of claim 11 wherein one of said track fallout thresholds include a threshold corresponding to whether said potential data error conditions are due to bad media or bad hardware.

19. The system of claim 18 further including the means for recording the execution of a bellcord action in a head element performance table based on whether the bellcord action resulted from bad media or bad hardware.

20. In a tape drive data storage apparatus including a control system for reading and writing data on a plurality of data tracks of a streaming tape medium, an error correction coding (ECC) system for detecting and correcting data transfer errors, and an error recovery system for performing non-ECC correctable error recovery, a method for dynamically anticipating and resolving potential data error conditions comprising the steps of:
performing read and/or write data transfer operations on a plurality of data tracks of a tape medium loaded in the tape drive;
generating during said data transfer operations a track performance database representing a map of potential data error conditions occurring on the tape, said map being dividing the tape into a plurality of tachometer regions and data tracks;
determining from said track performance database whether one or more track fallout thresholds have been reached a selected area of the tape, said track fallout thresholds including a threshold for determining persistent track fallout for one or more data tracks and for one or more adjacent tachometer regions of the tape; and if so
performing an error recovery bellcord action including a tape backhitch or refresh action to minimize subsequent track fallout conditions occurring on the tape.

* * * * *

UNITED STATES PATENT AND TRADEMARK OFFICE
CERTIFICATE OF CORRECTION

PATENT NO. : 5,386,324
DATED : January 31, 1995
INVENTOR(S) : Fry et al

It is certified that error appears in the above-indentified patent and that said Letters Patent is hereby corrected as shown below:

Column 10, line 41, delete "being".

Column 10, line 45, add --for-- after "reached".

Signed and Sealed this

Fifteenth Day of August, 1995

Attest:

BRUCE LEHMAN

Attesting Officer     Commissioner of Patents and Trademarks